US010230471B2

United States Patent
Ho et al.

(10) Patent No.: US 10,230,471 B2
(45) Date of Patent: Mar. 12, 2019

(54) COAXIAL TRANSMITTER OPTICAL SUBASSEMBLY (TOSA) WITH CUBOID TYPE TO LASER PACKAGE AND OPTICAL TRANSCEIVER INCLUDING SAME

(71) Applicant: Applied Optoelectronics, Inc., Sugar Land, TX (US)

(72) Inventors: I-Lung Ho, Sugar Land, TX (US); Chong Wang, Stafford, TX (US); Justin Lii, Houston, TX (US); Zhengyu Miao, Sugar Land, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 15/576,635

(22) PCT Filed: May 23, 2016

(86) PCT No.: PCT/US2016/033759
§ 371 (c)(1),
(2) Date: Nov. 22, 2017

(87) PCT Pub. No.: WO2016/191359
PCT Pub. Date: Dec. 1, 2016

(65) Prior Publication Data
US 2018/0131442 A1 May 10, 2018

Related U.S. Application Data

(63) Continuation of application No. 14/720,336, filed on May 22, 2015, now Pat. No. 9,614,620, which is a (Continued)

(51) Int. Cl.
*G02B 6/42* (2006.01)
*H04B 10/40* (2013.01)
(Continued)

(52) U.S. Cl.
CPC ........... *H04B 10/40* (2013.01); *G02B 6/4292* (2013.01); *G02B 6/43* (2013.01); *H04B 10/506* (2013.01);
(Continued)

(58) Field of Classification Search
CPC .... H04B 10/504; H04B 10/50; H04B 10/503; H04B 10/506; H04B 1/38; G02B 6/4246;
(Continued)

(56) References Cited

U.S. PATENT DOCUMENTS 4,727,554 A 2/1988 Watanabe
4,786,132 A 11/1988 Gordon
(Continued)

FOREIGN PATENT DOCUMENTS

EP 1006683 A2 6/2000
JP 2000174397 A 6/2000
(Continued)

OTHER PUBLICATIONS

PCT International Search Report and Written Opinion dated Oct. 22, 2012 received in corresponding PCT Application No. PCT/US2012/046912, 8 pgs.
(Continued)

*Primary Examiner* — Thomas A Hollweg
*Assistant Examiner* — Mary A El-Shammaa
(74) *Attorney, Agent, or Firm* — Grossman Tucker Perreault & Pfleger, PLLC; Norman S. Kinsella

(57) ABSTRACT

A coaxial transmitter optical subassembly (TOSA) including a cuboid type TO laser package may be used in an optical transceiver for transmitting an optical signal at a channel wavelength. The cuboid type TO laser package is made of a thermally conductive material and has substantially flat outer surfaces that may be thermally coupled to substantially flat outer surfaces on a transceiver housing and/or on other
(Continued)

cuboid type TO laser packages. An optical transceiver may include multiple coaxial TOSAs with the cuboid type TO laser packages stacked in the transceiver housing. The cuboid type TO laser package may thus provide improved thermal characteristics and a reduced size within the optical transceiver.

17 Claims, 7 Drawing Sheets

Related U.S. Application Data continuation-in-part of application No. 13/760,533, filed on Feb. 6, 2013, now Pat. No. 9,236,945.

(51) Int. Cl.
*G02B 6/43* (2006.01)
*H04B 10/50* (2013.01)
*H04J 14/02* (2006.01)

(52) U.S. Cl.
CPC ........ *H04J 14/025* (2013.01); *H04J 14/0246* (2013.01)

(58) Field of Classification Search
CPC ...... G02B 6/42; G02B 6/4273; G02B 6/2938; G02B 6/4269; G02B 6/4271
See application file for complete search history.

(56) References Cited

U.S. PATENT DOCUMENTS

| | | | |
|---|---|---|---|
| 4,976,527 A | 12/1990 | Horikawa et al. |
| 5,042,898 A | 8/1991 | Morey et al. |
| 5,499,256 A | 3/1996 | Bischel et al. |
| 5,729,563 A | 3/1998 | Wang et al. |
| 5,732,102 A | 3/1998 | Bouadma |
| 5,757,828 A | 5/1998 | Ouchi |
| 5,924,290 A | 7/1999 | Yoshino |
| 5,937,120 A | 8/1999 | Higashi |
| 5,987,200 A | 11/1999 | Fleming et al. |
| 6,111,999 A | 8/2000 | Espindola et al. |
| 6,118,562 A | 9/2000 | Lee et al. |
| 6,188,705 B1 | 2/2001 | Krainak et al. |
| 6,275,629 B1 | 8/2001 | Eggleton et al. |
| 6,303,040 B1 | 10/2001 | Oh et al. |
| 6,348,358 B1 | 2/2002 | Sousa et al. |
| 6,411,746 B1 | 6/2002 | Chamberlain et al. |
| 6,416,238 B1 | 7/2002 | Gilliland et al. |
| 6,480,513 B1 | 11/2002 | Kapany et al. |
| 6,683,895 B2 | 1/2004 | Pilgrim et al. |
| 6,741,629 B1 | 5/2004 | Garnache et al. |
| 6,853,671 B2 | 2/2005 | Liu et al. |
| 6,856,475 B2 * | 2/2005 | Nasu ................... G02B 6/4208 359/820 |
| 6,917,636 B2 | 7/2005 | Blauvelt et al. |
| 6,920,159 B2 | 7/2005 | Sidorin et al. |
| 6,974,260 B2 | 12/2005 | Scheibenreif et al. |
| 7,027,469 B2 | 4/2006 | Sidorin et al. |
| 7,184,621 B1 | 2/2007 | Zhu |
| 7,899,105 B1 | 3/2011 | Hargis et al. |
| 7,965,949 B1 | 6/2011 | Wach |
| 8,777,496 B2 | 7/2014 | Kuwahara |
| 9,419,717 B2 | 8/2016 | Huang et al. |
| 2001/0017960 A1 | 8/2001 | Terahara |
| 2002/0131122 A1 | 9/2002 | Anderl et al. |
| 2003/0095346 A1 * | 5/2003 | Nasu ................... G02B 6/4208 359/820 |
| 2003/0206740 A1 | 11/2003 | Lee et al. |
| 2005/0100290 A1 | 5/2005 | Huang |
| 2006/0083517 A1 * | 4/2006 | Saito ................... G02B 6/4201 398/140 |
| 2006/0215713 A1 | 9/2006 | Flanders et al. |
| 2007/0133647 A1 | 6/2007 | Daiber |
| 2007/0223552 A1 | 9/2007 | Muendel et al. |
| 2008/0259972 A1 | 10/2008 | Heanue et al. |
| 2008/0267246 A1 | 10/2008 | Volodin et al. |
| 2009/0185586 A1 | 7/2009 | Jhung et al. |
| 2010/0208756 A1 | 8/2010 | Noh |
| 2010/0232458 A1 | 9/2010 | Kim et al. |
| 2010/0266283 A1 | 10/2010 | Beckett |
| 2011/0058771 A1 | 3/2011 | Lee et al. |
| 2011/0135309 A1 | 6/2011 | Lee et al. |
| 2012/0039572 A1 | 2/2012 | Amirkiai et al. |
| 2012/0093184 A1 | 4/2012 | Krishnamoorthy et al. |
| 2012/0189323 A1 | 7/2012 | Xu et al. |
| 2014/0161457 A1 | 6/2014 | Ho et al. |
| 2014/0161459 A1 | 6/2014 | Ho et al. |
| 2015/0093073 A1 | 4/2015 | Wright |

FOREIGN PATENT DOCUMENTS

| | | |
|---|---|---|
| KR | 20000049869 A | 8/2000 |
| KR | 20000051030 A | 8/2000 |
| WO | 03012936 A2 | 2/2003 |
| WO | 03032021 A2 | 4/2003 |
| WO | 03056734 A1 | 7/2003 |

OTHER PUBLICATIONS

Lee, San-Liang, et al., "Trend and Applications of Tunable Semiconductor Lasers", Optoelectronic Materials and Devices II, Proc. of SPIE, vol. 6782, 67821H, 2007, Taipei, Taiwan, R.O.C., 10 pgs.
Palmer, Christopher, "Diffraction Gratings—The Crucial Dispersive Component", The Baseline, reprinted from Spectroscopy, vol. 10, No. 2, Feb. 1995, pp. 14-15.
PCT International Search Report and Written Opinion dated May 23, 2014, received in corresponding PCT Application No. PCT/US2014/014607, 11 pgs.
PCT International Search Report and Written Opinion dated Sep. 19, 2016, received in corresponding PCT Application No. PCT/US16/33759, 12 pgs.
EP Search Report dated Aug. 26, 2016, received in related EP Application No. 1479420.7, 9 pgs.
EP Extended Search Report dated Jan. 1, 2019, received in related EP Application No. 16800595.7, 8 pgs.

* cited by examiner

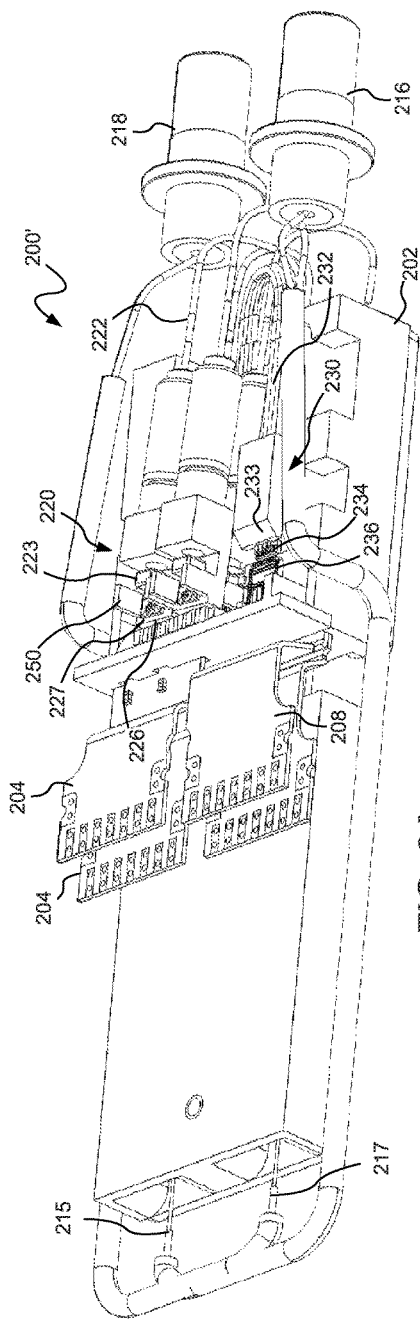
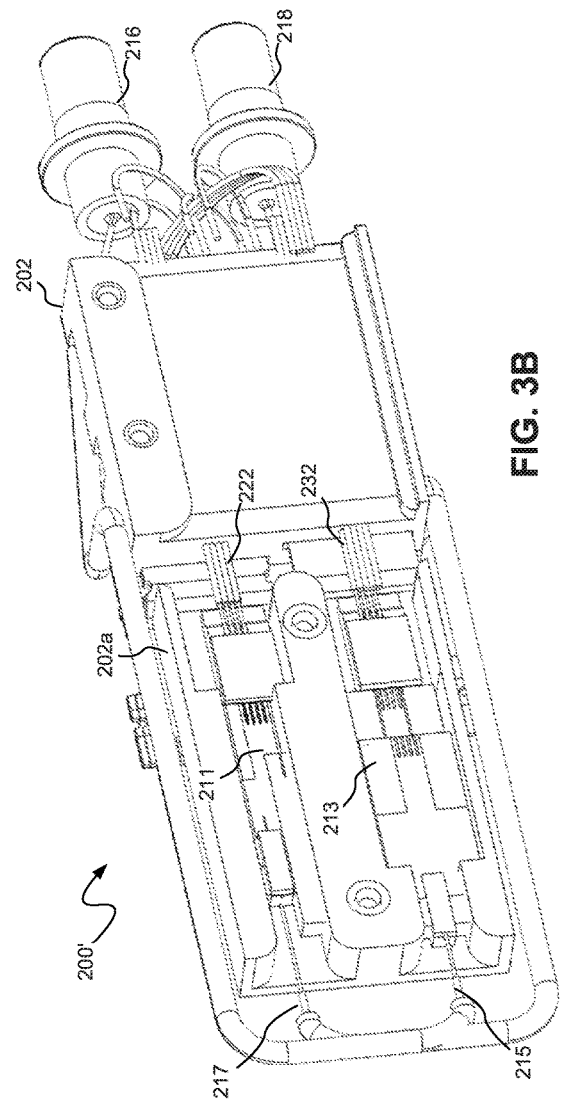
FIG. 3A
FIG. 3B

COAXIAL TRANSMITTER OPTICAL SUBASSEMBLY (TOSA) WITH CUBOID TYPE TO LASER PACKAGE AND OPTICAL TRANSCEIVER INCLUDING SAME

CROSS-REFERENCE TO RELATED APPLICATIONS

The present application is a continuation-in-part of U.S. patent application Ser. No. 13/760,533 filed Feb. 6, 2013, which is fully incorporated herein by reference.

TECHNICAL FIELD

The present disclosure relates to laser packages and more particularly, to a coaxial transmitter optical subassembly (TOSA) with a cuboid type TO laser package for use in an optical transceiver.

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to thermal management, insertion loss, and manufacturing yield.

Optical transceiver modules generally include one or more laser diode packages for housing a laser diode and for providing electrical connections and optical couplings to the laser diode. One challenge with optical transceiver modules is providing thermal management, especially with new optical transceiver modules that are designed to provide higher data rates within a relatively small form factor. In particular, the heat generated by the laser diode and associated components in the laser package may adversely affect the laser wavelengths or potentially even damage the laser and/or other components. Conventional TO can laser packages do not provide good heat conduction because the rounded surfaces of the TO can package do not provide sufficient contact for thermal coupling with other surfaces.

BRIEF DESCRIPTION OF THE DRAWINGS

These and other features and advantages will be better understood by reading the following detailed description, taken together with the drawings wherein:

FIGS. 3A and 3B are top and bottom perspective views, respectively, of another embodiment of an optical transceiver module including coaxial TOSAs with cuboid-type TO laser packages.

DETAILED DESCRIPTION

A coaxial transmitter optical subassembly (TOSA) including a cuboid type TO laser package, consistent with embodiments of the present disclosure, may be used in an optical transceiver for transmitting an optical signal at a channel wavelength. The cuboid type TO laser package is made of a thermally conductive material and has substantially flat outer surfaces that may be thermally coupled to substantially flat outer surfaces on a transceiver housing and/or on other cuboid type TO laser packages. An optical transceiver may include multiple coaxial TOSAs with the cuboid type TO laser packages stacked in the transceiver housing. The cuboid type TO laser package may thus provide improved thermal characteristics and a reduced size within the optical transceiver.

As used herein, "cuboid type TO package" refers to a laser package structure having a generally cuboid or parallelepiped outer shape formed by at least three substantially flat and orthogonal outer surfaces. For clarification, the term "TO" or "transistor outline" is derived from a reference to the traditional cylindrical package or "can" that historically encased a transistor, but as used herein, is otherwise unrelated to such transistor package. As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

As used herein, "thermally coupled" refers to a direct or indirect connection or contact between two components resulting in heat being conducted from one component to the other component and "thermally isolated" refers to an arrangement where heat is prevented from being conducted to the isolated component from an external environment. In a thermally isolated multi-channel TOSA, for example, heat external to the TOSA is prevented from being conducted to one or more components in the TOSA. As used herein, "thermally shielded" refers to an arrangement that prevents heat from being transferred by convection or radiation to the shielded component. Thermally isolated and thermally shielded do not necessarily require an arrangement to prevent all heat from being conducted or transferred.

Figure 1A:
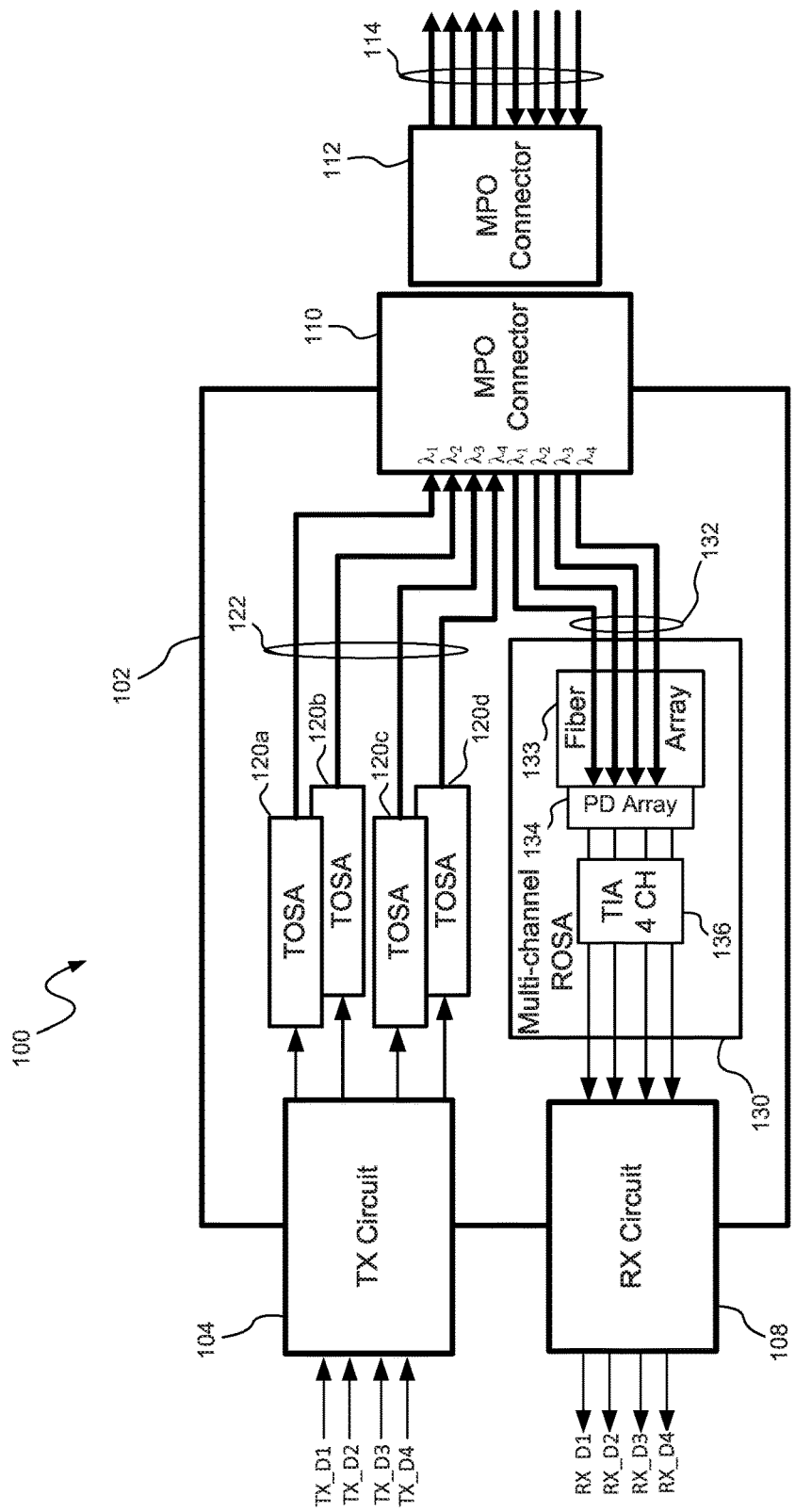
FIGS. 1A and 1B are functional block diagrams of multiple channel optical transceivers, consistent with embodiments of the present disclosure.

Referring to FIG. 1A, an optical transceiver 100, consistent with embodiments of the present disclosure, is shown and described. In this embodiment, the optical transceiver 100 transmits and receives four (4) channels using four different channel wavelengths ($\lambda_1, \lambda_2, \lambda_3, \lambda_4$) and may be capable of transmission rates of at least about 10 Gbps per channel. In one example, the channel wavelengths $\lambda_1, \lambda_2, \lambda_3, \lambda_4$ may be 1270 nm, 1290 nm, 1080 nm, and 1330 nm, respectively. The optical transceiver 100 may also be capable of transmission distances of 2 km to at least about 10 km. The optical transceiver 100 may be used, for example, in internet data center applications or fiber to the home (FTTH) applications.

This embodiment of the optical transceiver 100 includes multiple transmitter optical subassemblies (TOSAs) 120a-d for transmitting optical signals on different channel wavelengths and a multi-channel receiver optical subassembly (ROSA) 130 for receiving optical signals on different channel wavelengths. The TOSAs 120a-d and the multi-channel ROSA 130 are located in a transceiver housing 102. A transmit connecting circuit 104 and a receive connecting circuit 108 provide electrical connections to the TOSAs 120a-d and the multi-channel ROSA 130, respectively, within the housing 102. The transmit connecting circuit 104 is electrically connected to the electronic components (e.g., the laser, monitor photodiode, etc.) in each of the TOSAs 120a-d and the receive connecting circuit 108 is electrically connected to the electronic components (e.g., the photodiodes, the TIA, etc.) in the multi-channel ROSA 130. The transmit connecting circuit 104 and the receive connecting circuit 108 include at least conductive paths to provide electrical connections and may also include additional circuitry.

A multi-fiber push on (MPO) connector 110 provides optical connections to the TOSAs 120a-d and the multi-channel ROSA 130 within the housing 102. The MPO connector 110 is optically coupled to the TOSAs 120a-d and the multi-channel ROSA 130 via transmit optical fibers 122 and receive optical fibers 132, respectively. The MPO connector 110 is configured to be coupled to a mating MPO connector 112 such that the optical fibers 122, 132 in the optical transceiver 100 are optically coupled to external optical fibers 114.

Each of the TOSAs 120a-d may be a coaxial TOSA with a coaxial configuration electrically connected at one end to conductive paths on the transmit connecting circuit 104 and optically coupled at the other end to a respective one of the optical fibers 122. Each of the TOSAs 120a-d may include a laser for generating laser light at the assigned channel wavelength and optics for coupling the laser light into the respective optical fiber 122. The lasers in the TOSAs 120a-d thus convert electrical data signals (TX_D1 to TX_D4) received via the transmit connecting circuit 104 into modulated optical signals transmitted over transmit optical fibers 122. The lasers may include, for example, distributed feedback (DFB) lasers with diffraction gratings. Each of the TOSAs 120a-d may also include a monitor photodiode for monitoring the light emitted by the lasers. Each of the TOSAs 120a-d may further include one or more temperature control devices, such as a resistive heater and/or a thermoelectric cooler (TEC), for controlling a temperature of the lasers, for example, to control or stabilize the laser wavelengths.

The multi-channel ROSA 130 includes a photodetector array 134 including, for example, photodiodes optically coupled to a fiber array 133 formed by the ends of the receive optical fibers 132. The multi-channel ROSA 130 also includes a multi-channel transimpedance amplifier 136 electrically connected to the photodetector array 134. The photodetector array 134 and the transimpedance amplifier 136 detect and convert optical signals received from the fiber array 133 into electrical data signals (RX_D1 to RX_D4) that are output via the receive connecting circuit 108.

This embodiment of the optical transceiver 100 does not include an optical multiplexer or demultiplexer. The optical signals may be multiplexed and demultiplexed external to the optical transceiver 100.

Figure 1B:
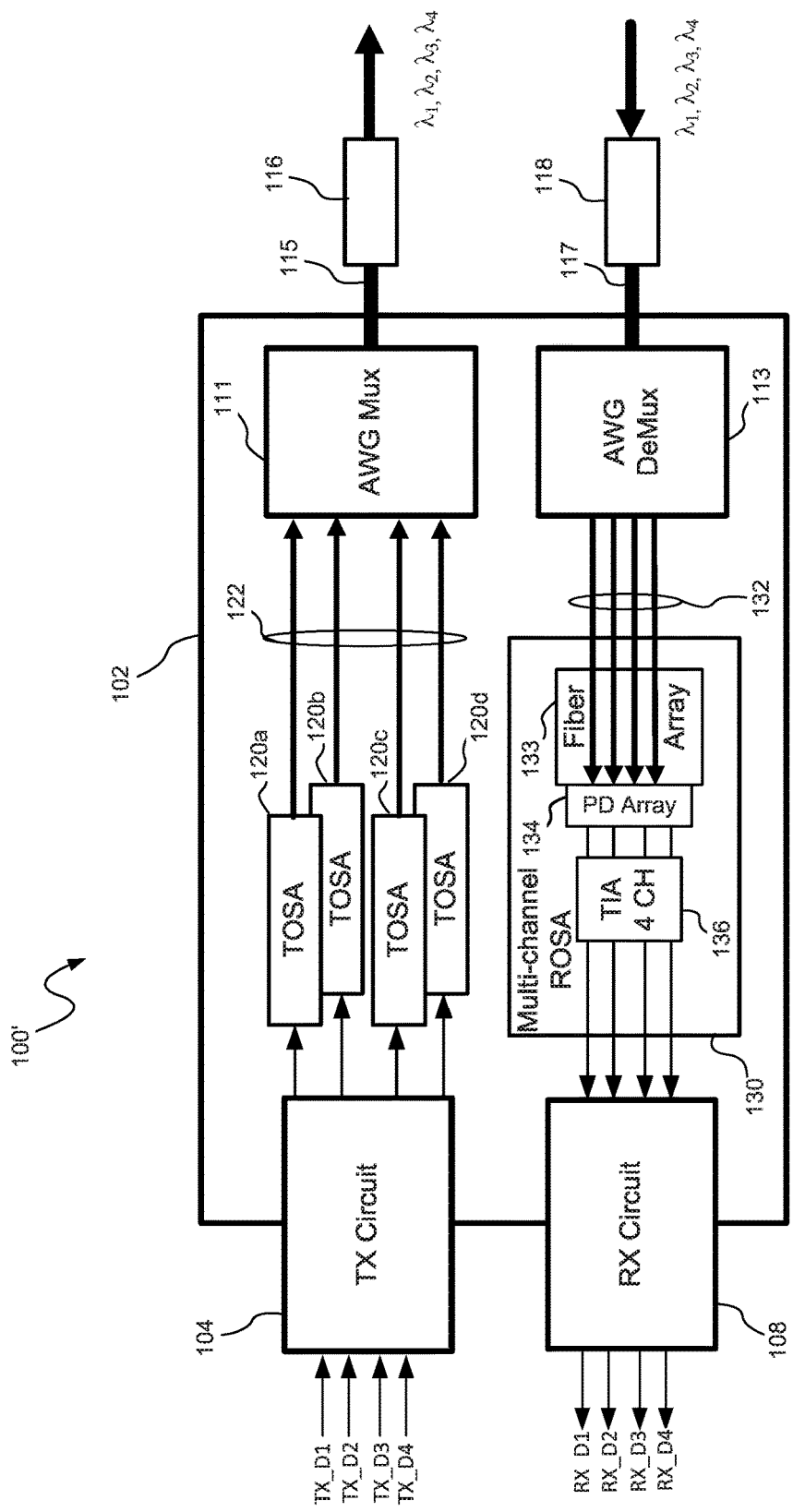

Referring to FIG. 1B, another embodiment of an optical transceiver 100' includes the same light engine (e.g., TOSAs 120a-d and ROSA 130) described above together with an optical multiplexer 111 and an optical demultiplexer 113. The optical multiplexer 111 and the optical demultiplexer 113 both may include arrayed waveguide gratings (AWGs). The optical multiplexer 111 is optically coupled to the transmit optical fibers 122 and the optical demultiplexer 113 is optically coupled to the receive optical fibers 132. The optical multiplexer 111 multiplexes the optical signals being transmitted over transmit optical fibers 122 to provide a multiplexed optical signal on an output optical fiber 115. The optical demultiplexer 113 demultiplexes a multiplexed optical signal received on an input optical fiber 117 to provide received optical signals on receive optical fibers 132. The output optical fiber 115 and the input optical fiber 117 are coupled to an output optical connector 116 and an input optical connector 118, respectively.

This embodiment of the optical transceiver 100' includes 4 channels and may be configured for coarse wavelength division multiplexing (CWDM), although other numbers of channels are possible. This embodiment of the optical transceiver 100' may also be capable of transmission rates of at least about 10 Gbps per channel and transmission distances of 2 km to at least about 10 km and may be used in internet data center applications or fiber to the home (FTTH) applications.

Figure 2:
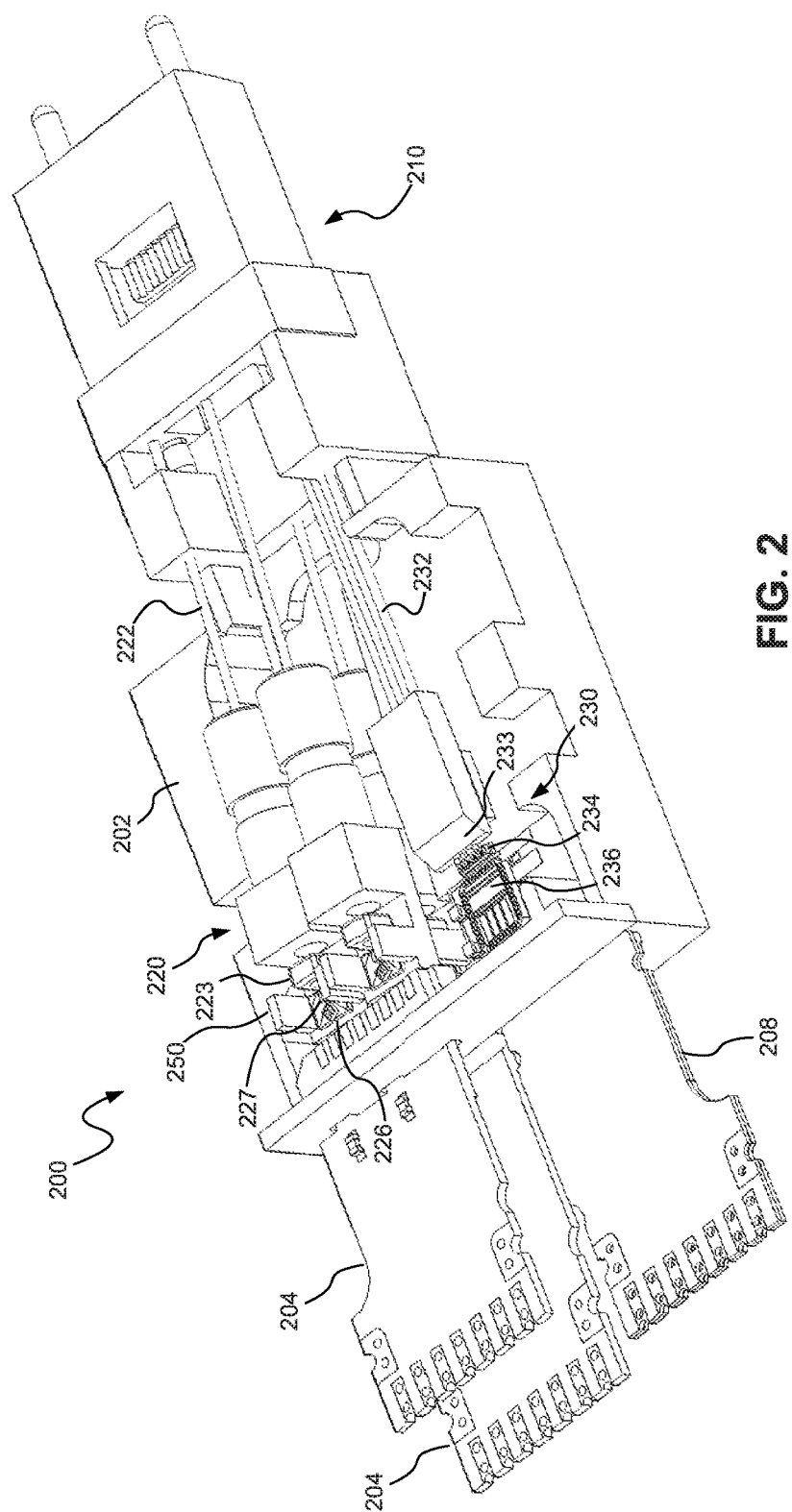
FIG. 2 is a perspective view of an embodiment of an optical transceiver module including coaxial TOSAs with cuboid-type TO laser packages.

Referring to FIG. 2, an embodiment of an optical transceiver module 200 with an MPO connector 210 is described and shown in greater detail. The optical transceiver module 200 may be designed to have a relatively small form factor with minimal space. The optical transceiver module 200 includes a transceiver housing 202, four coaxial TOSAs 220 stacked together in one region of the housing 202, and a multi-channel ROSA 230 located in another region of the housing 202. The coaxial TOSAs 220 are electrically connected to transmit flexible printed circuits (FPCs) 204 at one end of the housing 202 and optically coupled to the MPO connector 210 at the other end of the housing 202 via transmit optical fibers 222. The multi-channel ROSA 230 is electrically connected to a receive flexible printed circuit (FPC) 208 at one end of the housing 202 and optically coupled to the MPO connector 210 at the other end of the housing 202 via receive optical fibers 232.

Each of the coaxial TOSAs 220 includes a cuboid type TO laser package 250 that contains a laser submount 226, a diode laser 227 on the submount 226, and a lens 223. The laser submount 226 electrically connects the diode laser 227 to the respective transmit FPC 204, for example, using wire bonding. The lens 223 optically couples the laser 227 to the respective transmit optical fiber 222. The cuboid type TO laser package 250 has a generally cuboid or parallelepiped outer shape to provide heat dissipation and/or thermal shielding, as will be described in greater detail below. Each of the coaxial TOSAs 220 has a coaxial configuration such that electrical connections are made from one end of the TOSA 220 and an optical coupling is made from the other end of the TOSA 220.

The multi-channel ROSA 230 includes a fiber array 233 optically coupled to a photodetector array 234 and a transimpedance amplifier (TIA) 236 electrically connected to the photodetector array 234. The end faces of the optical fibers 232 in the fiber array 233 may be angled (e.g., at 45°)

such that the light is reflected from the angled face to couple with the respective photodiodes in the photodetector array 234. The TIA 236 is electrically connected to the receive FPC 208, for example, using wire bonding.

Referring to FIGS. 3A and 3B, another embodiment of an optical transceiver module 200' including an optical multiplexer and an optical demultiplexer is shown in greater detail. The optical transceiver module 200' includes the coaxial TOSAs 220, the multi-channel ROSA 230, and the FPCs 204, 208, as described above. This embodiment of the optical transceiver module 200' further includes an AWG housing portion 202a that contains a multiplexing AWG 211 and a demultiplexing AWG 213. The AWG housing portion 202a may be coupled to and/or extend from the transceiver housing 202. The multiplexing AWG 211 is optically coupled to the coaxial TOSAs 220 via transmit optical fibers 222 and the demultiplexing AWG 213 is optically coupled to the ROSA 230 via the receive optical fibers 232. The multiplexing AWG 211 and the demultiplexing AWG 213 are optically coupled to output optical connector 216 and input optical connector 218, respectively, via output optical fiber 215 and input optical fiber 217, respectively.

These embodiments of the optical transceiver module 200, 200' both include coaxial TOSAs 220 with cuboid type TO packages, as will be described in greater detail below. The coaxial TOSA 220 with the cuboid type TO package may also be used in other types of optical transceivers such as the multi-channel transceiver used in an optical line terminal (OLT), as described in greater detail in U.S. Patent Application Publication No. 2014/0161459, which is fully incorporated herein by reference. The coaxial TOSA 220 with the cuboid type TO package may also be used in an optical transmitter without a ROSA.

Figure 4:
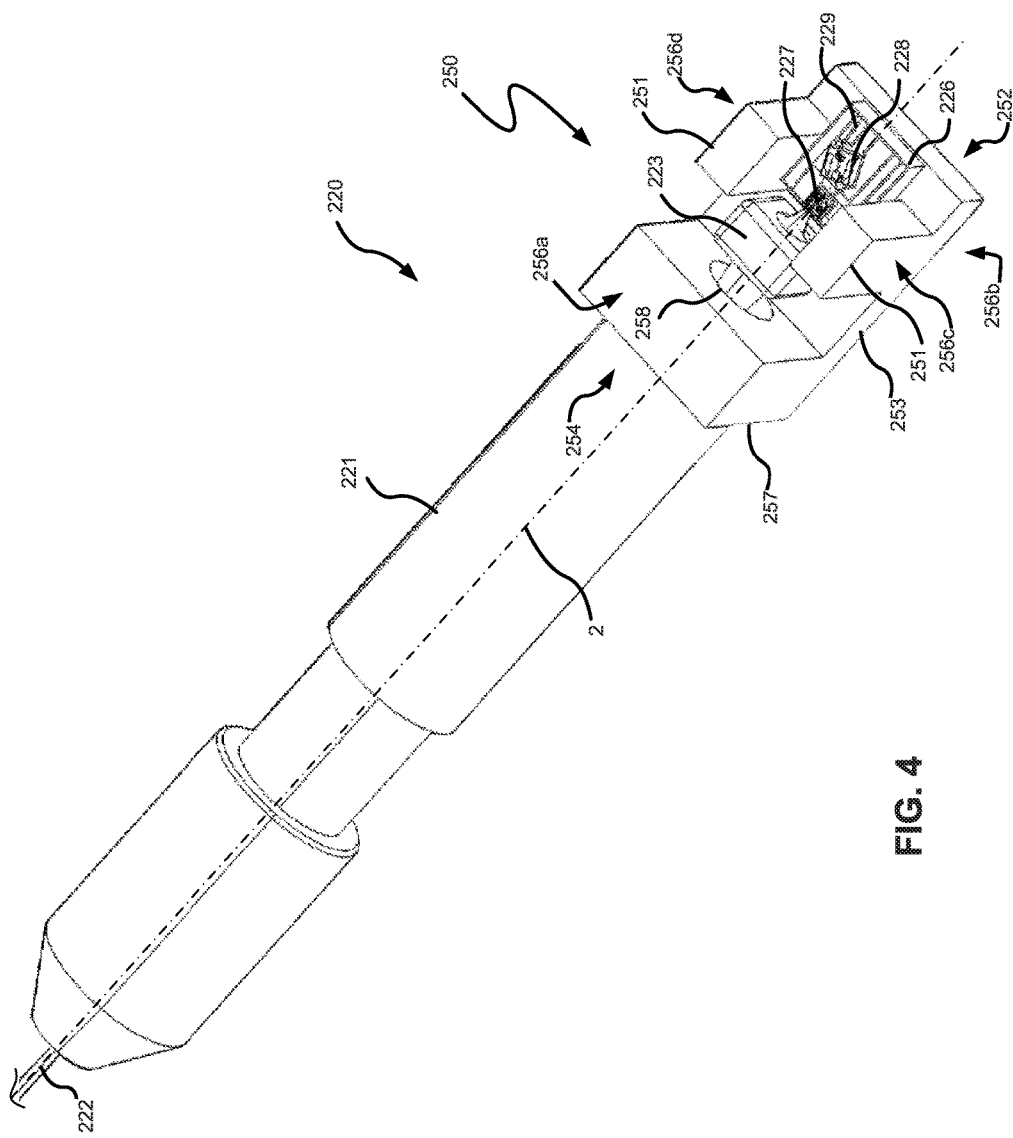
FIG. 4 is a perspective view of an embodiment of the coaxial TOSA for use in the optical transceiver modules shown in FIGS. 2, 3A, and 3B.
Figure 5:
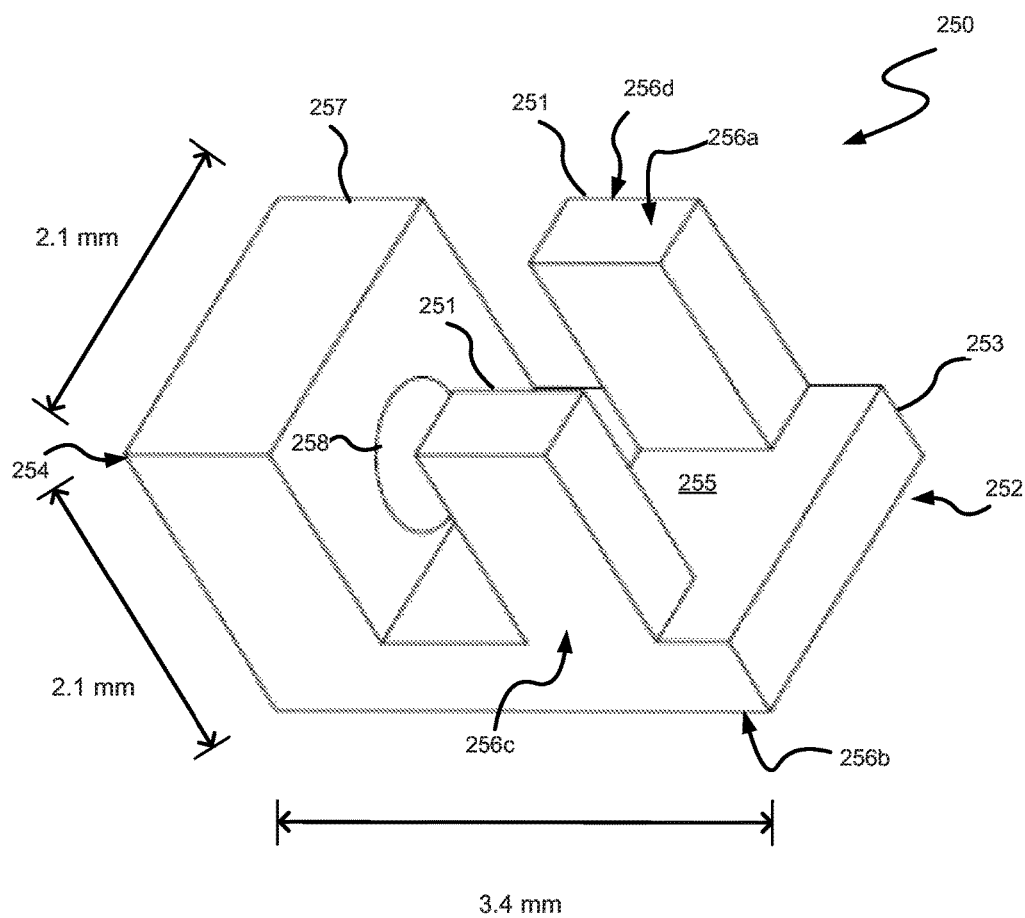
FIG. 5 is a perspective view of an embodiment of the cuboid type TO laser package used in the mini coaxial TOSA shown in FIG. 4.

As shown in greater detail in FIGS. 4 and 5, each coaxial TOSA 220 includes a cuboid type TO laser package 250 that contains the laser submount 226, the diode laser 227, and the lens 223 and/or other optics. The cuboid type TO laser package 250 includes an electrical connecting end 252 opposite an optical coupling end 254. The laser submount 226 is mounted proximate the electrical connecting end 252 such that electrical leads or wires (not shown) may be electrically connected to conductive paths 229 on the submount and extend from the electrical connecting end 252. An optical coupling receptacle 221 extends from the optical coupling end 254 for optically coupling the laser 227 to an optical fiber 222. The conductive paths 229 (and electrical leads), the laser 227, the lens 223, the optical coupling receptacle 221 and the optical fiber 222 are generally aligned or positioned coaxially along a longitudinal axis 2, thereby providing the coaxial configuration of the coaxial TOSA 220.

A monitor photodiode 228 may also be mounted on the submount 226, for example, to monitor light emitted from the diode laser 227. In other embodiments, one or more temperature control devices may be provided within or on the cuboid type TO laser package 250. The temperature control devices may include a heater, such as a resistive heater, located adjacent the diode laser 227 to provide independent control of the temperature of the diode laser 227 and thus the wavelength of the emitted laser light. The cuboid type TO laser package 250 facilitates this independent temperature control of each laser 227 by preventing heat from outside of the package 250 from affecting the laser 227. Additionally or alternatively, the temperature control device may include a micro thermoelectric cooler (TEC) within the cuboid type TO laser package 250 to provide the individual and independent temperature control of the laser 227. A TEC may also be used outside of the cuboid type TO laser package 250 by thermally coupling to an outside surface of the cuboid type TO laser package 250.

The cuboid type TO laser package 250 includes at least one substantially flat outer surface substantially orthogonal to the electrical connecting end 252 and the optical coupling end 254 for contacting another substantially flat surface to facilitate heat transfer. In the illustrated embodiment, top, bottom, and side surfaces 256a-d are substantially flat, which allows multiple cuboid type TO laser packages 250 to be stacked in a transceiver housing, for example, as shown in FIGS. 2, 3A, and 3B. In this embodiment, the bottom surface 256b provides the greatest surface area for heat transfer.

In the illustrated embodiment, the cuboid type TO laser package 250 includes first and second side walls 251 extending from a base 253 to define a compartment 255 (see FIG. 5). The laser submount 226 is located in the compartment 255 between the side walls 251. Thus, the laser diode 227 is thermally shielded by the side walls 251. This embodiment of the cuboid type TO laser package 250 further includes an end wall 257 extending from the base 253 at the optical coupling end 254. The end wall 257 defines an aperture 258 that allows laser light to pass through for coupling into the optical fiber 222. Optics, such as an optical isolator, may also be located within the aperture 258.

The cuboid type TO laser package 250 may be formed as one piece or as multiple pieces attached together (e.g., the walls 251, 257 attached to the base 253). Although the illustrated embodiment shows the cuboid type TO laser package 250 with a particular shape, other shapes and configurations are also possible. In other embodiments, for example, the cuboid type TO laser package 250 may be closed at the top (e.g., the side opposite the base 253).

The cuboid type TO laser package 250 may be made of a thermally conductive material having a thermal conductivity greater than 60 W/(m·K) and more specifically greater than 80 W/(m·K) and, for example, about 160 W/(m·K). The cuboid type TO laser package 250 may be made, for example, from copper tungsten and may also be gold plated, for example, to facilitate soldering. In some embodiments, the cuboid type TO laser package 250 may be made from a nickel-cobalt ferrous alloy such as the type sold under the trademark KOVAR. Other thermally conductive materials may also be used.

The flat surfaces of the cuboid type TO laser package 250 advantageously provide for increased surface area contact between the package 250 and other packages or the transceiver housing. This increased surface area contact improves thermal transfer or heat conduction, and thus facilitates heat dissipation even in a smaller package design compared to traditional cylindrical type TO packages. In a conventional cylindrical type TO can package, the flat surfaces at the ends of the package cannot effectively be used for thermal transfer because it would interfere with the electrical connections and optical couplings made at these ends of the cylindrical type TO can package. The cuboid type TO package 250 provides the electrical connections and optical couplings at the ends in a coaxial configuration while also providing flat surfaces for thermal coupling and for stacking in a compact arrangement.

As shown in FIG. 5, the cuboid type TO laser package 250 may have a relatively small size. In some embodiments, the long axis of the base 253 may be less than 3.5 mm (in the illustrated example 3.4 mm). In some embodiments, the long axis of the walls 251 and the spacing between the outside surfaces of the walls may be less than 2.5 mm (in the illustrated example 2.1 mm). Thus, the cuboid type TO laser package 250 may provide a header of about 2 mm square, which is significantly smaller than a 5.6 mm header of a conventional cylindrical type TO can package. Although the walls 251 are shown as having the same size, this is not a limitation of the present disclosure.

Figure 6:
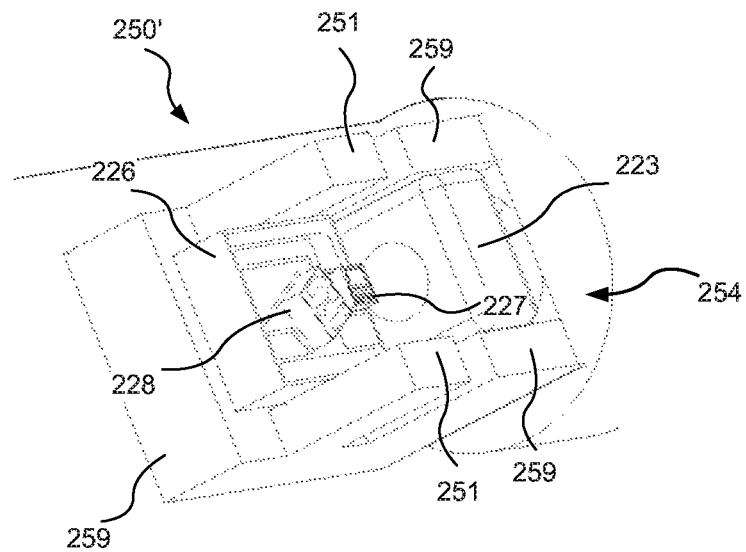
FIG. 6 is a perspective view of another embodiment of a coaxial TOSA with a cuboid type TO laser package for use in an optical transceiver module.
Figure 7:
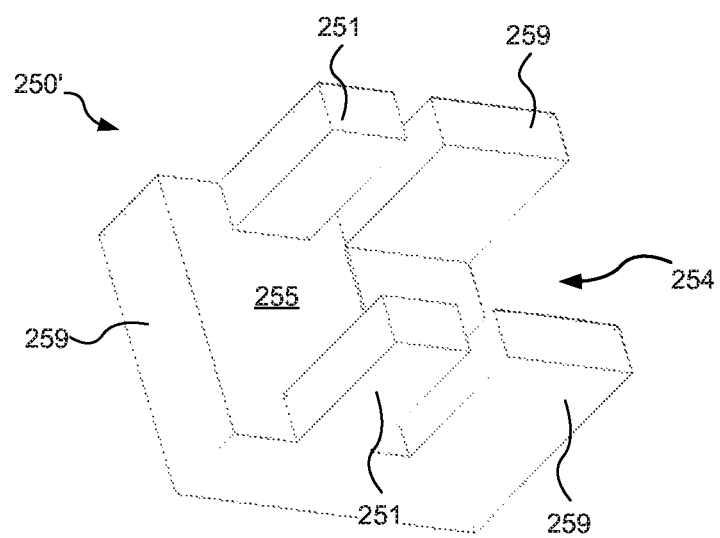
FIG. 7 is a perspective view of another embodiment of the cuboid type TO laser package used in the mini coaxial TOSA shown in FIG. 6.

Referring to FIGS. 6 and 7, another embodiment of a cuboid type TO laser package 250' is shown and described. In this embodiment, the cuboid type TO laser package 250' includes additional side walls 259 proximate the optical coupling end 254, instead of the end wall 257. The lens 223 is mounted between the additional side walls 259. In this embodiment, the side walls 251, 259 on each side are separated by a space. In other embodiments, a cuboid type TO laser package may include a single wall on each side of the base 253 and extending along at least a portion of the base 253 or along the entire side of the base 253. In another embodiment, a cuboid type TO laser package may include a single wall on each side of the base 253 and an end wall with an aperture to allow laser light to pass through. Various other configurations for the cuboid type TO laser package are within the scope of the present disclosure.

Accordingly, a cuboid type TO laser package, consistent with embodiments described herein, is used in a coaxial TOSA to provide improved thermal characteristics and reduced size. Multiple cuboid type TO laser packages may be stacked together within a relatively small space in a multi-channel optical transceiver with improved heat dissipation.

Consistent with an embodiment, a coaxial transmitter optical subassembly (TOSA) includes a cuboid type TO laser package including a base and at least first and second side walls extending from opposite sides of the base defining a compartment. The cuboid type TO laser package has a plurality of substantially flat outer surfaces, an optical coupling end, and an electrical connecting end opposite the optical coupling end. The cuboid type TO laser package is made of a thermally conductive material. The coaxial TOSA also includes a laser submount mounted on the base and between the first and second side walls. The laser submount includes conductive paths proximate the electrical connecting end for providing electrical connections. The coaxial TOSA further includes a laser diode mounted on the laser submount and electrically connected to the conductive paths and optics mounted proximate the optical coupling end for optically coupling the laser to an optical fiber.

Consistent with another embodiment, an optical transceiver module includes a transceiver housing, a plurality of coaxial TOSAs located in the transceiver housing for transmitting optical signals at different channel wavelengths, and a multi-channel receiver optical subassembly located in the transceiver housing for receiving optical signals at different channel wavelengths. Each of the coaxial TOSAs includes a cuboid type TO laser package including a base and at least first and second side walls extending from opposite sides of the base defining a compartment. The cuboid type TO laser package has a plurality of substantially flat outer surfaces, an optical coupling end, and an electrical connecting end opposite the optical coupling end. The cuboid type TO laser package is made of a thermally conductive material. The coaxial TOSA also includes a laser submount mounted on the base and between the first and second side walls. The laser submount includes conductive paths proximate the electrical connecting end for providing electrical connections. The coaxial TOSA further includes a laser diode mounted on the laser submount and electrically connected to the conductive paths and optics mounted proximate the optical coupling end for optically coupling the laser to an optical fiber.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A coaxial transmitter optical subassembly (TOSA) comprising:

a cuboid type TO laser package including a base and at least first and second side walls extending from opposite sides of the base defining a compartment, the cuboid type TO laser package having a plurality of substantially flat outer surfaces, the cuboid type TO laser package having an optical coupling end and an electrical connecting end opposite the optical coupling end, wherein the cuboid type TO laser package is made of a thermally conductive material having a thermal conductivity greater than 60 W/(m·K), wherein a long axis of the base is less than 3.5 mm and a long axis of the first and second side walls is less than 2.5 mm; and a laser submount mounted on the base and between the first and second side walls, the laser submount including conductive paths proximate the electrical connecting end for providing electrical connections;

a laser diode mounted on the laser submount and electrically connected to the conductive paths; and optics mounted proximate the optical coupling end for optically coupling the laser to an optical fiber.

2. The coaxial TOSA of claim 1 wherein the cuboid type TO laser package further includes an end wall extending from the base at the optical coupling end, the end wall including an aperture configured to allow laser light to pass through, wherein the laser diode and the optics are aligned with the aperture.

3. The coaxial TOSA of claim 2 wherein the optics include an isolator located inside the aperture and a lens aligned with the aperture.

4. The coaxial TOSA of claim 1 wherein the cuboid type TO laser package further includes third and fourth side walls extending from opposite sides of the base proximate the optical coupling end, wherein the optics include a lens located between the third and fourth side walls.

5. The coaxial TOSA of claim 1 wherein said thermally conductive material is a nickel-cobalt ferrous alloy.

6. The coaxial TOSA of claim 1 wherein said thermally conductive material has a thermal conductivity greater than 80 W/(m·K).

7. The coaxial TOSA of claim 1 wherein the optics include a lens.

8. The coaxial TOSA of claim 1 further including a monitor photodiode mounted on the laser submount.

9. The coaxial TOSA of claim 1 wherein at least one of the substantially flat outer surfaces is orthogonal to the electrical connecting end and the optical coupling end.

10. An optical transceiver module comprising:
a transceiver housing;
a plurality of coaxial TOSAs located in the transceiver housing for transmitting optical signals at different channel wavelengths, each of the plurality of coaxial TOSAs comprising:
  a cuboid type TO laser package including a base and at least first and second side walls extending from opposite sides of the base defining a compartment, the cuboid type TO laser package having a plurality of substantially flat outer surfaces, the cuboid type TO laser package having an optical coupling end and an electrical connecting end opposite the optical coupling end, wherein the cuboid type TO laser package is made of a thermally conductive material having a thermal conductivity greater than 60 W/(m·K), wherein a long axis of the base is less than 3.5 mm and a long axis of the first and second side walls is less than 2.5 mm, wherein the cuboid type TO laser packages of the plurality of coaxial TOSAs are stacked against each other such that at least one substantially flat surface of each of the cuboid type TO laser packages is thermally coupled to at least one substantially flat surface of another of the cuboid type TO laser packages, wherein cuboid type TO laser packages for the plurality of coaxial TOSAs are stacked together in the transceiver housing;
  a laser submount mounted on the base and between the first and second side walls, the laser submount including conductive paths proximate the electrical connecting end for providing electrical connections;
  a laser diode mounted on the laser submount and electrically connected to the conductive paths; and
  optics mounted proximate the optical coupling end for optically coupling the laser to an optical fiber; and
a multi-channel receiver optical subassembly located in the transceiver housing for receiving optical signals at different channel wavelengths.

11. The optical transceiver of claim 10 further comprising a transmit connecting circuit electrically connected to the coaxial TOSAs and a receive connecting circuit electrically connected to the ROSA.

12. The optical transceiver of claim 11 further comprising a multi-fiber push on (MPO) connector optically coupled to the coaxial TOSAs and the ROSA.

13. The optical transceiver of claim 11 further comprising an optical multiplexer optically coupled to the coaxial TOSAs for multiplexing the transmitted optical signals into a transmitted multiplexed optical signal and an optical demultiplexer coupled to the ROSA for demultiplexing a received multiplexed optical signal into the received optical signals.

14. The optical transceiver of claim 10 wherein at least one of the substantially flat surfaces of at least one of the cuboid type TO laser packages contacts a substantially flat surface of the transceiver housing.

15. The optical transceiver of claim 10 wherein the cuboid type TO laser package further includes an end wall extending from the base at the optical coupling end, the end wall including an aperture configured to allow laser light to pass through, wherein the laser diode and the optics are aligned with the aperture.

16. The optical transceiver of claim 15 wherein the optics include an isolator located inside the aperture and a lens aligned with the aperture.

17. The optical transceiver of claim 10 wherein the plurality of coaxial TOSAs includes four plurality of coaxial TOSAs configured to transmit at four different channel wavelengths at transmission rates of at least about 10 Gbps per channel and transmission distances of 2 km to at least about 10 km.

* * * * *